US012687449B2

(12) United States Patent
Decker et al.

(10) Patent No.: US 12,687,449 B2
(45) Date of Patent: Jul. 21, 2026

(54) DEVICE FOR LEAKAGE DETECTION VIA MASS SPECTROMETRY, HAVING A THREE-STAGE TURBOMOLECULAR PUMP AND A BOOSTER PUMP

(71) Applicant: INFICON GMBH, Cologne (DE)

(72) Inventors: Silvio Decker, Cologne (DE); Simon Mathioudakis, Cologne (DE)

(73) Assignee: INFICON GMBH, Cologne (DE)

( * ) Notice: Subject to any disclaimer, the term of this patent is extended or adjusted under 35 U.S.C. 154(b) by 366 days.

(21) Appl. No.: 18/266,251

(22) PCT Filed: Sep. 21, 2021

(86) PCT No.: PCT/EP2021/075897
§ 371 (c)(1),
(2) Date: Jun. 8, 2023

(87) PCT Pub. No.: WO2022/122206
PCT Pub. Date: Jun. 16, 2022

(65) Prior Publication Data
US 2024/0044737 A1 Feb. 8, 2024

(30) Foreign Application Priority Data
Dec. 10, 2020 (DE) ..................... 10 2020 132 896.6

(51) Int. Cl.
*G01M 3/20* (2006.01)

(52) U.S. Cl.
CPC ................................... *G01M 3/205* (2013.01)

(58) Field of Classification Search
CPC ....... G01M 3/205; F04D 25/16; F04D 19/046
See application file for complete search history.

(56) References Cited

U.S. PATENT DOCUMENTS 4,919,599 A     4/1990  Reich et al.
5,880,357 A  *  3/1999  Bohm ................... G01M 3/202
                                                    73/40.7
(Continued)

FOREIGN PATENT DOCUMENTS

DE        42 28 313 A1     3/1994
DE        43 43 912 A1     6/1995
(Continued)

OTHER PUBLICATIONS

DE 4228313 A1 (Year: 1994).*
(Continued)

*Primary Examiner* — Fatemeh Esfandiari Nia
(74) *Attorney, Agent, or Firm* — Dickinson Wright PLLC

(57) ABSTRACT

A device for leak detection on a test specimen, comprising a mass spectrometer (12), an at least three-stage turbomolecular pump (14), the input stage (18) of which is connected to the mass spectrometer (12) and which has a first intermediate gas inlet arranged between the input pump stage and the intermediate pump stage (26) and a second intermediate gas inlet arranged between the intermediate pump stage (26) and the output pump stage (24), an at least two-stage booster pump, the input pump stage (46) of which can be connected to the test specimen to be examined and which has an intermediate gas outlet (54) arranged between the input pump stage (46) and the output pump stage (48) and a pre-vacuum pump (22) which is connected to the outlet (20) of the output pump stage (24) of the turbomolecular pump (14) and is configured to generate a pre-vacuum pressure of less than 50 mbar at the outlet (20) of the turbomolecular pump (14) and to evacuate it against atmospheric pressure, characterized in that the intermediate gas outlet (54) of the booster pump is connected in a gas-conducting manner to the first intermediate gas inlet (36) of the turbomolecular pump (14) via a first connecting branch (62), and in that the (Continued)

outlet of the output pump stage (48) of the booster pump is connected in a gas-conducting manner to the second intermediate gas inlet of the turbomolecular pump (14) via a second connecting branch (64).

13 Claims, 1 Drawing Sheet

(56)                References Cited

U.S. PATENT DOCUMENTS

| | | | | |
|---|---|---|---|---|
| 10,978,288 | B2 * | 4/2021 | Gordon | H01J 49/0013 |
| 11,009,030 | B2 * | 5/2021 | Grosse Bley | F04D 29/104 |
| 2013/0028757 | A1 | 1/2013 | Stones et al. | |
| 2018/0328809 | A1 * | 11/2018 | Bruhns | G01M 3/205 |

FOREIGN PATENT DOCUMENTS

| | | |
|---|---|---|
| DE | 103 08 420 A1 | 9/2004 |
| DE | 103 19 633 A1 | 11/2004 |
| DE | 10 2014 223841 A1 | 5/2016 |
| DE | 10 2016 210701 A1 | 12/2017 |
| JP | H08-500675 A | 1/1996 |
| JP | 2019-532882 A | 8/2019 |
| WO | 94/05990 | 3/1994 |
| WO | 2012/104387 A1 | 8/2012 |

OTHER PUBLICATIONS

DE 42 28 313 A, U.S. Pat. No. 5,585,548 A.
DE 10 2014 223841 A1, US 20050066708 A1.
DE 10 2016 210701 A1, US 20190162193 A1.
DE 43 43 912 A1, Machine translation.
DE 103 08 420 A1, U.S. Pat. No. 7,240,536 B2.
DE 103 19 633 A1, U.S. Pat. No. 7,717,681 B2.
WO 2012/104387 A1, U.S. Pat. No. 8,407,221 B2.

* cited by examiner

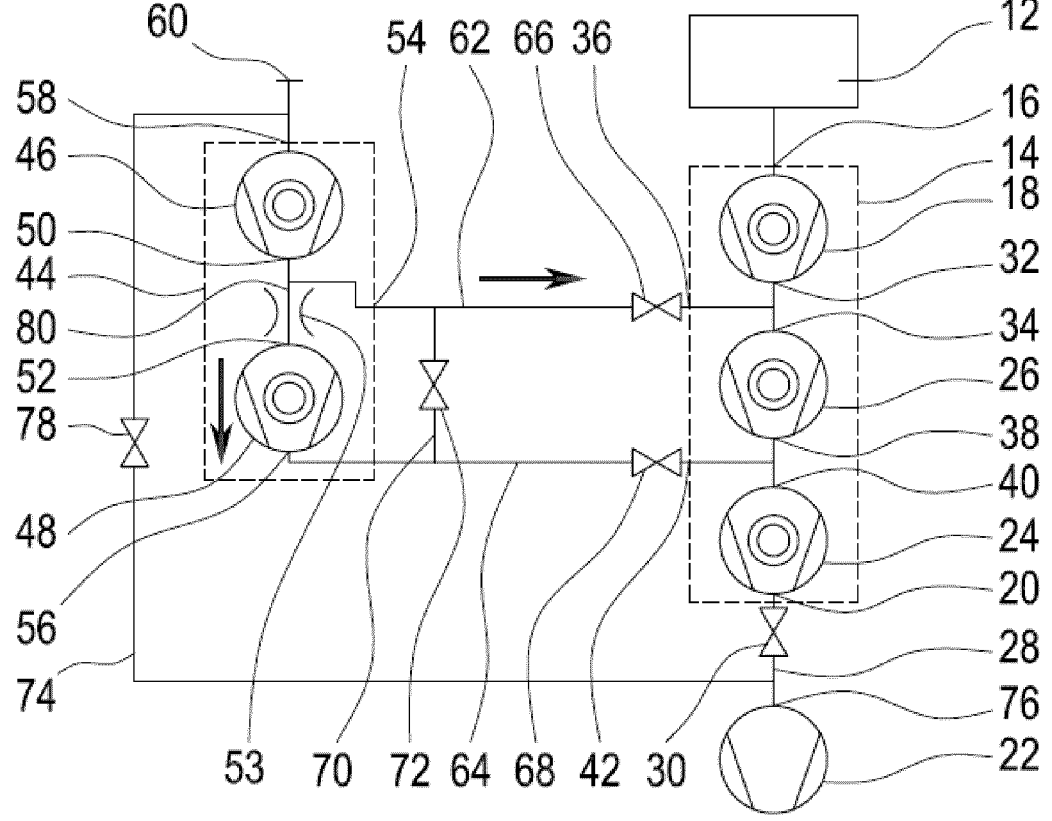

DEVICE FOR LEAKAGE DETECTION VIA MASS SPECTROMETRY, HAVING A THREE-STAGE TURBOMOLECULAR PUMP AND A BOOSTER PUMP

The invention relates to a device for mass-spectrometric leak detection with a three-stage turbomolecular pump and booster pump.

Known are mass spectrometric leak detection devices in which a mass spectrometer is evacuated by a multi-stage turbomolecular pump, the outlet of the turbomolecular pump being evacuated against atmospheric pressure via a pre-vacuum pump.

In this context, it is known, for example, from DE 10 2014 223 841 A1 to evacuate the test specimen to be examined via a separate booster pump, the outlet of which is evacuated via the pre-vacuum pump of the mass-spectrometric turbomolecular pump. In doing to, the pre-vacuum pump generates the pre-vacuum for both the mass-spectrometric turbomolecular pump and the booster pump. The booster pump has two stages with an intermediate gas outlet arranged between the two pump stages, which is connected in a gas-conducting manner to an intermediate gas inlet of the multi-stage, e.g. three-stage, turbomolecular pump. In leak detection, a partial flow is branched off via the connecting branch between the booster pump and the turbomolecular pump and fed to the mass spectrometer in counterflow through the input stage of the turbomolecular pump.

In doing so, test gas, usually helium, can accumulate at the outlet of the booster pump if the conveying capacity of the pre-vacuum pump is not sufficient to discharge the test gas. The accumulated test gas at the outlet of the booster pump can thereby pass through the output pump stage of the booster pump and the connecting branch into the intermediate gas inlet of the turbomolecular pump of the mass spectrometer and from there through the input stage of the turbomolecular pump into the mass spectrometer, where the test gas generates a background signal in the form of an offset error.

Therefore, the object of the invention is to provide an improved device for mass-spectrometric leak detection with a multi-stage booster pump and turbomolecular pump.

The device according to the invention is defined by claim 1. Accordingly, the mass-spectrometric turbomolecular pump arranged between the mass spectrometer and the pre-vacuum pump is configured as an at least three-stage vacuum pump, with a first intermediate gas inlet being formed between the input pump stage and the intermediate pump stage and a second intermediate gas inlet being formed between the intermediate pump stage and the output pump stage. The first intermediate gas inlet is connected to an intermediate gas outlet between the two pump stages of the at least two-stage booster pump via a first connecting branch, while the outlet of the booster pump, i.e. the outlet of the output pump stage, is connected to the second intermediate gas inlet of the mass-spectrometric turbomolecular pump via a second connecting branch.

As a result, the outlet of the booster pump is not only evacuated by the pre-vacuum pump, but also by the output pump stage of the mass-spectrometric turbomolecular pump, which is connected in series with the pre-vacuum pump. This results in a higher test gas partial pressure difference between the input stage of the booster pump and the inlet of the pre-vacuum pump, so that the test gas—e.g. helium—is taken away more efficiently. This reduces or even avoids a possible offset error resulting from accumulating test gas flowing countercurrently into the mass spectrometer via the first connecting branch.

Preferably, the first connecting branch and/or the second connecting branch each comprise a separately controllable valve for selectively closing the respective connecting branch.

The first connecting branch and the second connecting branch can be connected to each other in a gas-conducting manner via a bridge branch. The bridge branch also has a separately controllable valve for selectively closing the bridge branch. With the aid of the bridge branch, it is possible to evacuate the outlet of the booster pump via the first intermediate gas inlet, the middle pump stage and the output pump stage of the turbomolecular pump with a downstream pre-vacuum pump.

The inlet of the booster pump is provided with a port for the test specimen. The inlet of the booster pump can be connected to the inlet of the pre-vacuum pump and the outlet of the mass-spectrometric turbomolecular pump via a bypass branch, the bypass branch also having a separately controllable valve for selectively closing the bypass branch. Via the bypass branch, the test specimen can be evacuated to the atmosphere directly and exclusively via the pre-vacuum pump, without the booster pump or the turbomolecular pump evacuating the test specimen.

In the following, an exemplary embodiment of the invention is explained in detail with reference to the FIGURE. The FIGURE shows an exemplary embodiment of the device according to the invention.

A mass spectrometer 12 is evacuated by a three-stage turbomolecular pump 14, mass spectrometer 12 being connected in a gas-conducting manner to inlet 16 of input pump stage 18 of the turbomolecular pump. A pre-vacuum pump 22 is connected in a gas-conducting manner to the outlet of turbomolecular pump 14. The outlet of turbomolecular pump 14 is formed by output 20 of output pump stage 24. A middle pump stage 26 is provided between input pump stage 18 and output pump stage 24 of the mass-spectrometric turbomolecular pump 14.

Gas conduction path 28 connecting the outlet of the turbomolecular pump to the pre-vacuum pump 22 is provided with a separately controllable valve 30 for selectively closing gas conduction path 28.

Output 32 of the first pump stage 18 and input 34 of middle pump stage 26 are connected in a gas-conducting manner to a first intermediate gas inlet 36 of turbomolecular pump 14.

In a corresponding manner, output 38 of intermediate pump stage 26 and input 40 of output pump stage 24 are connected in a gas-conducting manner to a second intermediate gas inlet 42.

A two-stage booster pump 44 comprises an input booster pump stage 46 and an output booster pump stage 48, outlet 50 of input booster pump stage 46 and input 52 of output booster pump stage 48 being connected in a gas-conducting manner to an intermediate gas outlet 54 of booster pump 44. Output 56 of output booster pump stage 48 forms the outlet of booster pump 44.

Input 58 of input booster pump stage 46 forms the inlet of booster pump 44 and is connected in a gas-conducting manner to a port 60 for connecting the test specimen to be examined.

Intermediate gas outlet 54 and the first intermediate gas inlet 36 are connected to each other in a gas-conducting manner by a first connecting branch 62.

Outlet 56 and the second intermediate gas inlet 42 are connected to each other in a gas-conducting manner by a second connecting branch 64.

The first connecting branch 62 has a separately controllable valve 66 for selectively closing the first connecting branch 62. The second connecting branch 64 has a separately controllable valve 68 for selectively closing the second connecting branch 64.

The first connecting branch 62 and the second connecting branch 64 are connected to each other in a gas-conducting manner by a bridge branch 70. Bridge branch 70 has a separately controllable valve 72 for selectively closing bridge branch 70.

Test specimen port 60 and inlet 58 of booster pump 44 are connected in a gas-conducting manner to inlet 76 of pre-vacuum pump 22 and to outlet 20 of the mass-spectrometric turbomolecular pump 14 via a bypass branch 74. Bypass branch 74 has a selectively controllable valve 78 for separately closing bypass branch 74.

Gas conduction path 80 connecting output 50 of input booster pump stage 46 and input 52 of output booster pump stage 48 is provided with a flow throttle 53 arranged in the region of input 52 of output booster pump stage 48.

The two pump stages 46, 48 of booster pump 44 are arranged on a common shaft, input booster pump stage 46 being a turbomolecular pump stage and output booster pump stage 48 being a Holweck stage.

The pump stages 18, 26, 24 of the mass-spectrometric turbomolecular pump 14 may also be arranged on a common shaft. Input pump stage 18 and middle pump stage 26 can be part of a two-stage turbomolecular pump whose two pump stages 18, 26 are arranged on a common rotor shaft, thereby forming a common turbomolecular pump stage. Output pump stage 24 can be a Holweck stage. Output pump stage 24 can be arranged of the same shaft as the two turbomolecular pump stages 18, 26.

Pre-vacuum pump 22 is preferably formed separately from the mass-spectrometric turbomolecular pump 14 and from booster pump 44, and also does not share any common rotor shafts with the latter. However, it is conceivable that pre-vacuum pump 22 is arranged on the same rotor shaft as one or more pump stages of turbomolecular pump 14 and/or booster pump 44.

First, with the valves 66, 68, 30 closed, the test specimen connected to test specimen port 60 is evacuated from pre-vacuum pump 22 via bypass branch 74 when valve 78 in bypass branch 74 is open. In addition, once sufficient pressure is achieved at test specimen port 60, valve 30 in gas conduction path 28 is opened to evacuate the mass spectrometer 12 via turbomolecular pump 14 and pre-vacuum pump 22. In this operating state, referred to as "gross", detection of large leaks is already possible with the mass spectrometer 12.

For the actual leak detection, as soon as the sufficient vacuum pressure is achieved in the test specimen or at test specimen port 60, respectively, valve 78 in bypass branch 74 is closed and the valves 66, 68 in connecting branches 62, 64 are opened. As a result, when booster pump 44 is running, the gas flows from test specimen port 60 through connecting branches 62, 64 into turbomolecular pump 14, where a portion of the test gas, e.g., helium or hydrogen, passes countercurrently through input pump stage 18 into mass spectrometer 12, while the main portion of the gas is evacuated to atmosphere via middle pump stage 26, output pump stage 24, and pre-vacuum pump 22.

The invention claimed is:

1. A device for leak detection on a test specimen, comprising a mass spectrometer, an at least three-stage turbomolecular pump, comprising an input pump stage, intermediate pump stage and an output pump stage, the input pump stage of which is connected to the mass spectrometer and which has a first intermediate gas inlet arranged between the input pump stage and the intermediate pump stage and a second intermediate gas inlet arranged between the intermediate pump stage and the output pump stage, an at least two-stage booster pump, comprising an input pump stage and an output pump stage, the input pump stage of which is connected to the test specimen to be examined and which has an intermediate gas outlet arranged between the input pump stage and the output pump stage of the booster pump, and a pre-vacuum pump connected to an outlet of the output pump stage of the turbomolecular pump and configured to generate a pre-vacuum pressure of less than 50 mbar at the outlet of the turbomolecular pump and to evacuate it against atmospheric pressure, wherein the intermediate gas outlet of the booster pump is connected in a gas-conducting manner to the first intermediate gas inlet of the turbomolecular pump via a first connecting branch, and an outlet of the output pump stage of the booster pump is connected in a gas-conducting manner to the second intermediate gas inlet of the turbomolecular pump via a second connecting branch.

2. The device according to claim 1, wherein the first connecting branch and/or the second connecting branch has a separately controllable valve for closing the connecting branch.

3. The device according to claim 1, wherein the inlet of the input pump stage of the booster pump is connected in a gas-conducting manner to the inlet of the pre-vacuum pump via a bypass branch, the bypass branch having a separately controllable valve for closing the bypass branch.

4. The device according to claim 1, wherein the first connecting branch and the second connecting branch are connected to each other in a gas-conducting manner by a bridge branch, wherein the bridge branch may have a separately controllable valve for closing the bridge branch.

5. The device according to claim 1, wherein the gas conduction path connecting the output of the output pump stage of the turbomolecular pump to the inlet of the pre-vacuum pump has a separately controllable valve for selectively closing the gas conduction path.

6. The device according to claim 1, wherein the input pump stage of the booster pump is a rotary vacuum pump.

7. The device according to claim 1, wherein the output pump stage of the booster pump is a molecular pump stage, in particular a Holweck stage.

8. The device according to claim 1, wherein the booster pump is a two-stage vacuum pump.

9. The device according to claim 1, wherein the input pump stage and intermediate pump stage of the turbomolecular pump form a two-stage turbomolecular pump.

10. The device according to claim 1, wherein the output pump stage of the turbomolecular pump is a Holweck stage.

11. The device according to claim 1, wherein the turbomolecular pump is a three-stage vacuum pump.

12. The device according to claim 1, wherein the pump stages of the booster pump are arranged on a common shaft, and/or that the pump stages of the turbomolecular pump are arranged on a common shaft.

13. The device according to claim 1, wherein the pre-vacuum pump is a separate vacuum pump independent of the booster pump and of the turbomolecular pump.

* * * * *